Patented Sept. 18, 1945

2,384,813

UNITED STATES PATENT OFFICE 2,384,813

MANUFACTURE OF PURE PHOSPHORIC ACID

John H. Coleman, Plainfield, N. J., assignor to Southern Phosphate Corporation, Baltimore, Md., a corporation of Delaware No Drawing. Application August 15, 1941, Serial No. 407,051

6 Claims. (Cl. 23—165)

In a first aspect thereof, the present invention relates to the manufacture of pure phosphoric acid from crude phosphatic material. In another aspect thereof, the invention may also be considered as relating to a method of purifying crude phosphoric acid which has been made by any one of the many known methods of producing this crude acid.

In the practice of the present invention, use is preferably made of those complex calcium phosphate compounds, hereinafter described, which are known to be formed on the "acid side" of calcium metaphosphate.

The most acid of the common calcium phosphates is monocalcium orthophosphate, $CaH_4(PO_4)_2$. Additional acid beyond this is usually termed "free acid" and is carefully avoided in making the ortho compounds usually sold as "superphosphate" for fertilizer.

The orthophosphate is readily convertible into the corresponding metaphosphate with the aid of heat, according to the following reaction:

$$CaH_4(PO_4)_2 \xrightarrow{heat} Ca(PO_3)_2 + 2H_2O$$

In contrast to the experience of the art with orthophosphate, it has been found to be entirely feasible to add "free acid" to the metaphosphate, with which it readily combines to form permanent stable compositions. Thus, for example, Pristoupil, in the specification of his U. S. Patent No. 1,925,644, teaches the conversion of metaphosphate (which has a $CaO:P_2O_5$ ratio of 1:1) into a stable compound having a $CaO:P_2O_5$ ratio of 1:2, by blowing $P_2O_5$ vapor into molten calcium metaphosphate. In copending application, Serial No. 365,127, filed jointly by me and Stephen G. Poll, it is shown that these compounds can be formed by mixing orthophosphoric acid with any of the common calcium orthophosphates, and calcining the mixture at meta temperatures (350–400° C.). Typical of this method is the reaction:

$$Ca_3(PO_4)_2 + 10H_3PO_4 \xrightarrow{heat} 3CaP_4O_{11} + 15H_2O$$

I have found that apparently an infinite number of such compounds can be made, ranging from calcium metaphosphate ($CaO:P_2O_5$ ratio of 1:1) up to the compound corresponding to the formula $CaP_4O_{11}$ ($CaO:P_2O_5$ ratio of 1:2). Within these limits the $CaO:P_2O_5$ ratio may be varied at will, and in each case a stable product results. I have further found that these compounds may be formed by mixing phosphate rock and anhydrous $P_2O_5$, and heating to fusion.

Iron and aluminum impurities present during the calcining operation are converted into iron and aluminum metaphosphates which are insoluble in metaphosphoric acid and subsequently are removed.

The term "compound" as used in the preceding paragraph and in the subsequent discussion, is not employed in its technical sense, since definite proof has not yet been developed that these products are compounds, technically.

The only method heretofore developed, insofar as I am aware, for converting these compounds into phosphoric acid, consists essentially of treating the same with concentrated sulfuric acid, followed by prolonged heating of the mixture at 150° C. This appears to bring about the following reacions:

$$CaP_4O_{11} + H_2SO_4 + H_2O \longrightarrow CaSO_4 + 4HPO_3$$

This prior method involves a number of disadvantages. The rapid absorption of the water by the $P_2O_5$, liberated in the course of the reaction, in addition to the heat necessary for the reaction, results in a considerable degree of volatilization of $SO_3$, with a corresponding re-formation of insoluble calcium phosphate. Unless carried out under most exacting conditions, considerable loss of $SO_3$ by volatilization and considerable loss of $P_2O_5$ in the residue will be experienced.

The phosphatic material is usually bound up with iron and alumina compounds as impurities, and the precipitation of calcium sulfate simultaneously with iron and aluminum phosphates makes it exceedingly difficult, is not utterly impossible, to recover either of these by-products.

The present invention is therefore primarily concerned with the obviation and elimination of these prior art defects, and to make it possible to produce phosphoric acid in high yield and in high purity, while separately recovering the valuable by-products—all in relatively simple and easy manner.

This and other objects of the present invention, which will be apparent to those skilled in the art from the disclosure contained in this specification, is realized as a result of the discovery that the aforementioned compounds, wherein the $CaO:P_2O_5$ ratio ranges from 1:1 to 1:2, react more favorably with phosphoric acid, $H_3PO_4$, than with the sulfuric acid heretofore employed by the art.

It has been found that, as a matter of fact, the calcium phosphate which is undergoing conversion completely dissolves in concentrated phosphoric acid. The following exemplary equation represents the decomposition of the complex calcium phosphate by phosphoric acid:

$$CaP_4O_{11} + H_3PO_4 = Ca(PO_3)_2 + 3HPO_3.$$

Thus it will be seen that the treatment of the acid calcium metaphosphate having a CaO to $P_2O_5$ ratio within the above specified limits with phosphoric acid results in the conversion of the acid calcium metaphosphate to calcium metaphosphate having a CaO to $P_2O_5$ ratio of 1:1, with the production of metaphosphoric acid and the freeing of the calcium and iron metaphosphates.

The phosphoric acids are not volatile under the conditions of this reaction and, in view of the solubility of calcium metaphosphate in meta acid, a high degree of $P_2O_5$ recovery is realized. Such iron and aluminum metaphosphates as are formed during the reaction are insoluble in the metaphosphoric acid generated by this treatment and consequently can be readily filtered off. The filtrate may then be treated with sulfuric acid to precipitate insoluble calcium sulfate which can be readily separated from the accompanying mixture of meta and ortho phosphoric acids. The meta acid is spontaneously transformed into ortho form.

It will be evident from the foregoing that a preliminary step in the manufacture of pure phosphoric acid according to the present invention is the production of a calcium phosphate which is more acid than calcium metaphosphate, i. e. wherein the CaO:$P_2O_5$ ratio is between 1:1 and 1:2. The particular method of production of this phosphate is, per se, not an integral part of the present invention and any suitable and/or convenient process, such as those hereinbefore outlined, may be employed for this purpose.

In a typical procedure within the purview of the present invention, the phosphate thus prepared and preferably in substantially anhydrous form, may advantageously be reduced to comminuted form—the particular degree of comminution being variable within rather wide limits—and the reaction or treatment with the phosphoric acid, $H_3PO_4$, according to this invention may be carried out in any suitable type of apparatus, such for example as an acid-resistant mixing tank or chamber in which the phosphatic material and the phosphoric acid, preferably in the form of concentrated acid (sp. gr. 1.87, 100% $H_3PO_4$) are intimately and intensively mixed, whereupon dissolution of the former in the latter takes place. 100% $H_3PO_4$ for this purpose may be readily secured from the next step in the process, namely by controlled dilution of the meta acid; part of this diluted acid, 100% strong, can be returned for mixing the next batch.

The proportions of phosphatic material and phosphoric acid thus inter-reacted may advantageously be so proportioned as to produce a solution consisting essentially of about 35% of the $P_2O_5$ as $Ca(PO_3)_2$ and about 65% as mixed phosphoric acids, it having been found that this relationship is an optimum one insofar as complete dissolution of the solid material is concerned. In pounds, the original mixture may consist of about 100 lbs. $CaP_4O_{11}$ to 55 lbs. 100% $H_3PO_4$. There will, of course, always be turbidity due to precipitated iron and aluminum metaphosphates.

Stirring may preferably be continued until no further dissolution is apparent (30 to 60 minutes) whereupon, after dilution with a suitable amount of water (e. g. sufficient to make about 75% $H_3PO_4$), filtration may be effected in any commercial type of filter in order to recover the insoluble iron and aluminum phosphates. Any other solid matter precipitated or formed so far in the process also will be removed during the filtration.

The filtrate, essentially a solution of calcium metaphosphate in mixed phosphoric acids, may then be admixed in an acid-resistant tank with sulfuric acid of suitable concentration (e. g. acid of about 60° Bé concentration which may or may not be further diluted with water), whereby the calcium of the calcium metaphosphate is precipitated in the form of a substantially pure, insoluble and readily filtrable calcium sulfate. After removal of the latter by filtration, the resultant liquor consists essentially of an admixture of metaphosphoric acid and orthophosphoric acid. the metaphosphoric acid automatically combines with the water which is present to form additional orthophosphoric acid. The result of the foregoing is the production of orthophosphoric acid in very high yield and in a high degree of purity. It will be apparent that under the conditions of the reaction according to the present invention, no losses of the character experienced in the sulfuric acid treatment according to the prior art are encountered. By controlling the amounts of water added, the concentration of the resultant product may also be controlled. The usual acid of commerce (75%) is readily obtainable.

In the second aspect of the invention, i. e. when applying the same for the purification of crude phosphoric acid, the latter is first converted into the form of a phosphate wherein the CaO:$P_2O_5$ ratio ranges between 1:1 and 1:2, for instance by reacting with calcium orthophosphate and calcining at a meta temperature (350–400° C.). The resultant phosphate is then treated with additional phosphoric acid, preferably derived from a later step in the process, according to the present invention whereupon the hereinbefore described solution of calcium metaphosphate in metaphosphoric acid is produced. This is then treated with sulfuric acid, as above described, eliminating the calcium and finally producing pure orthophosphoric acid.

Having thus described the essential principle of the present invention—it being understood in this regard that the foregoing description is intended to be illustrative rather than limitative or restrictive—what is claimed and desired to be protected by Letters Patent is:

1. A process for producing phosphoric acid which comprises maintaining a substantially anhydrous acid calcium metaphosphate containing CaO and $P_2O_5$ in a ratio less than 1:1 but not less than 1:2 in intimate contact with phosphoric acid of such strength and for such length of time as to convert at least the major portion of said acid calcium metaphosphate to a calcium metaphosphate having a CaO and $P_2O_5$ ratio of 1:1 and to form metaphosphoric acid, bringing the resulting calcium metaphosphate in solution in phosphoric acid into intimate contact with sulfuric acid to form phosphoric acid and to precipitate calcium present as calcium sulphate, and recovering the phosphoric acid.

2. A process for producing phosphoric acid which comprises maintaining a substantially anhydrous acid calcium metaphosphate containing CaO and $P_2O_5$ in a ratio less than 1:1 but not less than 1:2 and containing iron and aluminum metaphosphates as impurities in intimate contact with phosphoric acid of such strength and for such length of time as to convert at least the major portion of said acid calcium metaphosphate into calcium metaphosphate having a CaO to $P_2O_5$ ratio of 1:1, to form metaphosphoric acid and to free the iron and aluminum metaphosphates, separating the freed iron and aluminum metaphosphates, bringing the calcium metaphosphate having the CaO to $P_2O_5$ ratio of 1:1 while in solution in phosphoric acid into intimate contact with sulphuric acid to form phosphoric acid and to precipitate calcium present as calcium sulphate, and recovering the phosphoric acid.

3. A process for producing phosphoric acid which comprises maintaining a substantialy anhydrous acid calcium metaphosphae containing CaO and $P_2O_5$ in a ratio less than 1:1 but not less than 1:2 and containing iron and aluminum metaphosphates as impurities into intimate contact with phosphoric acid of such strength and for such length of time as to convert at least the major portion of said acid calcium metaphosphate to calcium metaphosphate having a CaO to $P_2O_5$ ratio of 1:1, to form metaphosphoric acid, and to free the iron and aluminum metaphosphates, diluting the phosphoric acid, filtering off the freed iron and aluminum metaphosphates, bringing the calcium metaphosphate having the CaO to $P_2O_5$ ratio of 1:1 while in solution in phosphoric acid into intimate contact with sulphuric acid to form phosphoric acid and to precipitate calcium present as calcium sulphate, and recovering the phosphoric acid.

4. A process for producing phosphoric acid of high purity which comprises maintaining a substantially anhydrous acid calcium metaphosphate containing CaO and $P_2O_5$ in a ratio less than 1:1 but not less than 1:2 and containing iron and aluminum metaphosphates as impurities in intimate contact with phosphoric acid of such strength and for such length of time as to convert at least the major portion of said acid calcium metaphosphate to calcium metaphosphate having a CaO to $P_2O_5$ ratio of 1:1 in mixed phosphoric acids and to free the iron and aluminum metaphosphates, separating the freed iron and aluminum metaphosphates, bringing the calcium metaphosphate having the CaO to $P_2O_5$ ratio of 1:1 in solution in the mixed phosphoric acids into intimate contact with sulphuric acid to form phosphoric acid and to precipitate calcium present as calcium sulphate, and recovering the phosphoric acid of high purity.

5. A process for producing phosphoric acid of high purity which comprises mixing crude phosphoric acid with a calcium phosphate in an amount such as to give a resulting mixture containing CaO and $P_2O_5$ in a ratio less than 1:1 but not less than 1:2, calcining the resulting mixture at a temperature sufficiently high to form a substantially anhydrous acid calcium metaphosphate containing CaO and $P_2O_5$ within said ratios, maintaining the substantially anhydrous acid calcium metaphosphate in intimate contact with phosphoric acid of such strength and for such length of time as to convert at least the major portion of the acid calcium metaphosphate to calcium metaphosphate having a CaO to $P_2O_5$ ratio of 1:1 and to form metaphosphoric acid, bringing the resulting calcium metaphosphate while in solution in phosphoric acid into intimate contact with sulphuric acid to form phosphoric acid and to precipitate calcium present as calcium sulphate, and recovering the phosphoric acid.

6. A process for producing phosphoric acid of high purity which comprises mixing crude phosphoric acid with a calcium phosphate in an amount sufficient to give a resulting mixture containing CaO and $P_2O_5$ in a ratio less than 1:1 but not less than 1:2, calcining the resulting mixture at a temperature between about 350° C. to 400° C. to form a substantially anhydrous acid calcium metaphosphate, maintaining the substantially anhydrous acid calcium metaphosphate in intimate contact with phosphoric acid of such strength and for such length of time and at a temperature sufficiently high to convert at least most of the acid calcium metaphosphate to calcium metaphosphate having a CaO to $P_2O_5$ ratio of 1:1 in mixed phosphoric acids, bringing the resulting calcium metaphosphate while in solution in the mixed phosphoric acids into intimate contact with sulphuric acid to form phosphoric acid and to precipitate calcium present as calcium sulphate, and recovering the phosphoric acid.

JOHN H. COLEMAN.